United States Patent [19]

Duwel et al.

[11] Patent Number: 4,535,421
[45] Date of Patent: Aug. 13, 1985

[54] UNIVERSAL REAL TIME TRANSPARENT ASYNCHRONOUS SERIAL/ECHOPLEX CONVERTER

[75] Inventors: Edward C. Duwel, Trumbull; John H. Soderberg, Stratford, both of Conn.

[73] Assignee: Pitney Bowes Inc., Stamford, Conn.

[21] Appl. No.: 510,792

[22] Filed: Jul. 5, 1983

[51] Int. Cl.³ .............................................. G06F 5/04
[52] U.S. Cl. .................................................. 364/900
[58] Field of Search ... 364/200 MS File, 900 MS File, 364/464

[56] References Cited

U.S. PATENT DOCUMENTS

| | | | |
|---|---|---|---|
| 4,301,507 | 11/1981 | Soderberg et al. | 364/464 |
| 4,395,756 | 7/1983 | Daniels | 364/200 |
| 4,410,961 | 10/1983 | Dlugos et al. | 364/900 |
| 4,410,962 | 10/1983 | Daniels et al. | 364/900 |
| 4,466,079 | 8/1984 | Daniels et al. | 364/900 |

*Primary Examiner*—Harvey E. Springborn

*Attorney, Agent, or Firm*—David E. Pitchenik; William D. Soltow, Jr.; Albert W. Scribner

[57] ABSTRACT

Interface apparatus allows a serial communicating device to communicate with an echoplex communicating device. A first microprocessor coupled to the serial device converts serial data to a parallel format. The parallel formatted data is transferred to a second microprocessor which is coupled to the echoplex device. The second microprocessor converts the parallel data from the first microprocessor into echoplex data for transmission to the echoplex device. When data is to be transferred from the echoplex device to the first device, the second microprocessor converts the echoplex data to a parallel format. The parallel formatted data is transferred to the first microprocessor, for conversion into a serial form and transmission to the serial device. If both the serial and echoplex devices wish to transmit at the same time, priority is awarded to the echoplex device. The interface operates asynchronously on real time basis, and is transparent.

10 Claims, 3 Drawing Figures

UNIVERSAL REAL TIME TRANSPARENT ASYNCHRONOUS SERIAL/ECHOPLEX CONVERTER

BACKGROUND OF THE INVENTION

The present invention relates to an interface for allowing a computer to communicate with a peripheral device. More particularly, the invention relates to apparatus which enables a host computer, which inputs and outputs data in a serial format, to communicate with an external machine, such as a postage meter, which receives and transmits data in an echoplex format.

In using computers to control processes or other machinery, it is necessary to provide some way to able the computer to communicate with the apparatus to be controlled. Apparatus which is used to effect such communication is generally referred to as an interface. The interface must handle data transferred to and from the computer in the manner in which the computer outputs the data or expects to receive the data. Similarly, the apparatus being controlled by the computer will output data and expect to receive data in a particular format. The interface must provide for the desired communication between the computer and external apparatus, and if necessary must convert the data from the computer so that it will be understood by the external apparatus, and convert data from the external apparatus so that it will be understood by the computer.

Often, the external apparatus controlled by one computer (the "host computer") will be another computer, or a machine which incorporates its own computer. Where the host computer and the external apparatus use different communication schemes, an interface is required to convert data from one so that it is intelligible to the other, and vice versa.

One type of communication scheme often used by host computers is known as serial data communication. In serial communication, data is transmitted and/or received one bit at a time over a single wire pair. Sometimes, one wire is used to transmit serial data and another wire is used to receive serial data.

Another communication scheme sometimes used by computers is known as parallel communication. In parallel communication, a plurality of data bits are transmitted simultaneously along as many wires as there are bits to be communicated. Typically, data will be transmitted in 8-bit "bytes", in which case eight separate lines are utilized for the parallel communication of each of the 8 bits simultaneously.

Another type of communication, which has been used in electronic postage meters, is known as echoplex communication. Echoplex communication is a form of serial communication, wherein serial messages are asynchronously transmitted and received. The format of the messages, and the timing of the bits in different units is precisely set, however, to ensure that messages may be sent and received without the necessity for synchronizing each communicating computer. In addition, in echoplex communication, upon receipt of the first bits of a message from a transmitting unit, the received bits are retransmitted by the receiver back to the transmitter for comparison. This comparison enables the transmitter to determine if any errors have occurred in its transmission, or the receiver's reception, of data. Thus, with echoplex communication, the correctness of each message sent and received is verified within a minimum period of time following the complete message transmission.

The theory of echoplex communication, and in particular, its application to an electronic postage meter, is disclosed in U.S. Pat. No. 4,301,507, entitled "Electronic Postage Meter Having Plural Computing Systems", Issued Nov. 17, 1981, and assigned to the assignee of the present invention. As discussed in that patent, it is sometimes desirable to control the functions of an electronic postage meter from a remote location. In order to accomplish such control, an interface connector is provided in the electronic postage meter, for connection to the remote controller. Thus, for example, connection of an external device, such as an electronic scale, to the postage meter can be made to more fully automate the mailing process.

In order to provide additional opportunities for the remote control of electronic postage meters, an interface is required which will enable the remote controller (e.g., a host computer) to communicate with the postage meter to be controlled. Since the host computer will generally transmit and expect to receive data in a standard serial format, whereas the postage meter will transmit and expect to receive data in an echoplex serial format, the interface will have to provide for the conversion from one form of serial data to echoplex data, and vice versa. Such an interface should operate in real time, such that data from the postage meter is received as it is transmitted, and data from the host computer is received by the postage meter as it is transmitted.

Further, it would be advantageous if such an interface were transparent to both the postage meter and the host computer When an interface is referred to as transparent, it operates such that the apparatus which the interface couples together does not realize that the interface is present. In other words, a postage meter connected to host computer through a transparent interface will think that it is communicating directly with the host computer, and the host computer will think that it is communicating directly with the postage meter.

The present invention relates to such a universal real time transparent asynchronous serial/echoplex converter.

SUMMARY OF THE INVENTION

In accordance with the present invention, a transparent interface apparatus provides real time data communication between a first device utilizing serial communication and second device utilizing echoplex communication. A first microprocessor has a serial data port and a first parallel data port. A second microprocessor has a second parallel data port and an echoplex data port. A parallel communication path couples the first and second parallel data ports, and hence the first and second microprocessors. Apparatus within the first microprocessor for converting serial data from the serial data port into a parallel format and for transferring this parallel formatted data to the second parallel data port from the first parallel data port across the parallel communication path. Apparatus within the second microprocessor for converting parallel data from the second parallel data port into an echoplex format and for outputting the echoplex formatted data from the echoplex data port. Apparatus within the second microprocesor for converting echoplex data from the echoplex data port into a parallel format and for transferring this parallel formatted data to the first parallel data port from the second parallel data port across the parallel communication path. Apparatus within the first microprocessor for converting parallel data from the first parallel data port into a serial format and for outputting this serial formatted data from the serial data port. Finally, apparatus is provided for prioritizing data transfer between the first and second microprocessors. The prioritizing apparatus awards first priority to echoplex data to be transferred from the echoplex port for output from the serial data port. Second priority is awarded to serial data to be transferred from the serial port for output from the echoplex data port.

By providing a first clock apparatus operating the first microprocessor at one frequency, and second clock apparatus operating the second microprocessor at a different frequency, the first and second microprocessors operate asynchronously. Apparatus is also be provided for determining the time elapsed during data transfers between the serial data port and the echoplex data port. Such information is useful when the internal operation of the communicating devices is being studied.

In any communication scheme, it is important to insure the integrity of the communication by providing means for detecting errors. The present apparatus includes signalling when an error in communication has arisen.

DETAILED DESCRIPTION OF A PREFERRED EMBODIMENT

The present invention provides a transparent interface between a first device utilizing serial communication and a second device utilzing echoplex communication. The interface enables real time data communication, on an asynchronous basis, between the first device, which can be, for example, a host computer, and the second device, which can be, for example, a postage meter.

Figure 1:
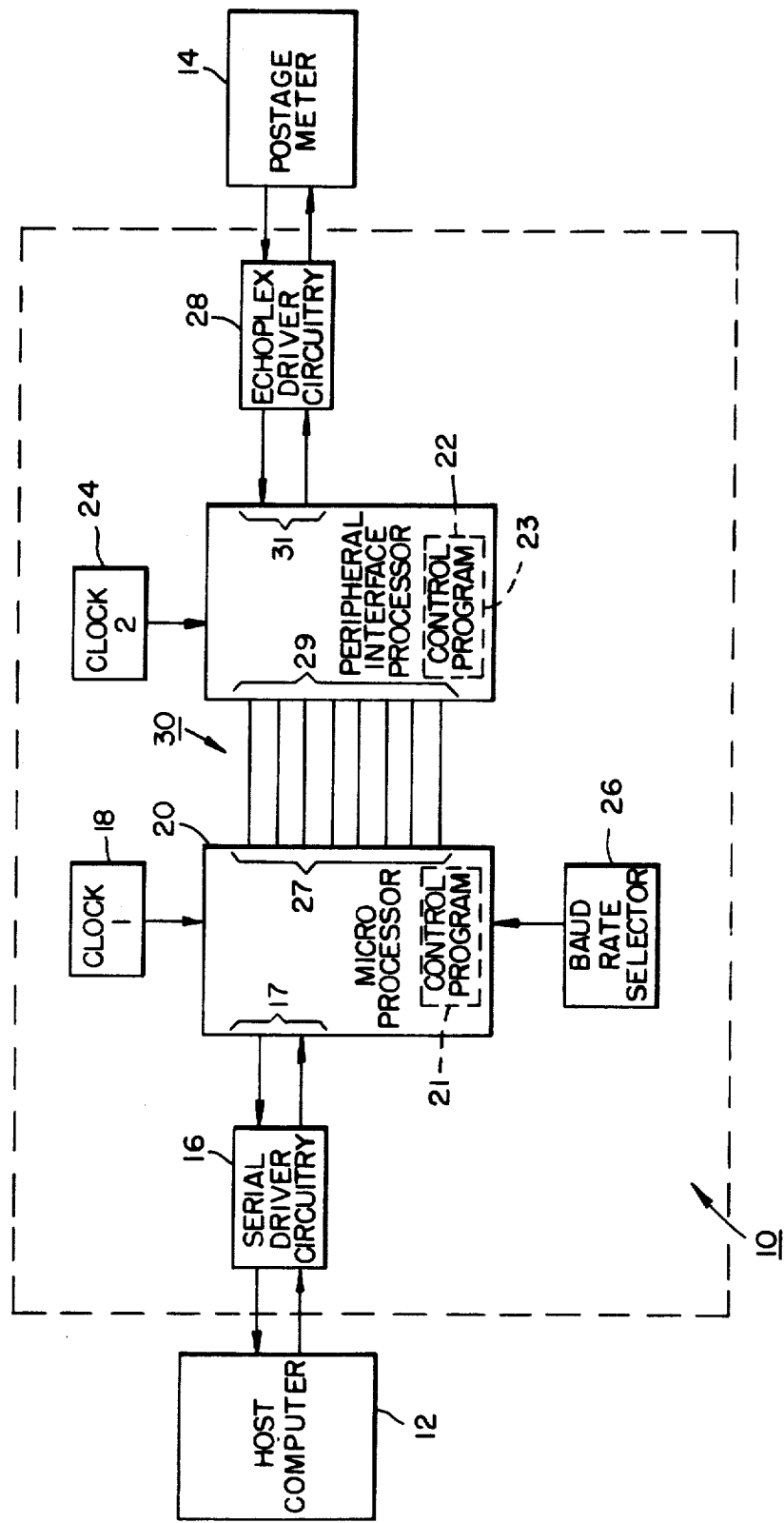
FIG. 1 is a block diagram of a real time, transparent, asynchronous, serial/echoplex converter in accordance with the present invention.

As shown in FIG. 1, an interface 10 is provided for coupling host computer 12 to postage meter 14. Serial data from host computer 12 is transferred to a microprocessor 20 via serial driver circuitry 16, through a serial data port 17. Microprocessor 20 includes a control program designated by a dashed box 21, which program is stored in non-volatile memory. The microprocessor may, for example, comprise the 8751 microcomputer from Intel Corporation, Santa Clara, Calif. This microcomputer includes read only memory (ROM) into which control program 21 can be stored. A first clock 18 is coupled to microprocessor 20 to establish the operating frequency of microprocessor 20. First clock 18 is a stable clock, preferably crystal controlled, which, for example, may operate at a frequency of 6 megahertz. A baud rate selector may be provided, which is coupled to microprocessor 20 in order to provide a user selectable baud rate for the transmission of data through interface 10.

Microprocessor 20 includes a first parallel data port 27 which is coupled, by way of a parallel communication path 30, to a second parallel data port 29 of peripheral interface processor 22. Peripheral interface processor 22 is a specialized microprocessor which includes a control program in non-volatile memory, designated by reference numeral 23. Peripheral interface processor 22 may, for example, be the universal peripheral controller manufactured by Intel Corporation and designated as the 8741 microcomputer. A second clock 24 is coupled to peripheral interface processor 22 to set the operating frequency thereof. Second clock 24 may, for example, operate at a frequency of about 3.5 megahertz.

A postage meter 14 is coupled to peripheral interface processor 22 through echoplex driver circuitry 28. An echoplex data port 31 of peripheral interface processor 22 is coupled to echoplex driver circuitry 28.

In operation, serial data from host computer 12 is converted by microprocessor 20 into parallel data, which travels across parallel communication path 30 to peripheral interface processor 22. The parallel data from microprocessor 20 is converted to echoplex data by peripheral interface processor 22, and output from echoplex data port 31 thereof. In the other direction, echoplex data from postage meter 14 is converted by peripheral interface processor 22 into parallel data. The converted echoplex data is transferred, in parallel format, across communication path 30 to microprocessor 20. Microprocessor 20 converts the parallel data from peripheral interface processor 22 into a serial format, which is then output to host computer 12 through serial driver circuitry 16.

Interface 10 operates asynchronously, is transparent, and provides real time data communication between host computer 12 (serial data) and postage meter 14 (echoplex data).

Echoplex communication is particularly suitable for communication to devices in which security must be maintained. An example of such a device is a postage meter. In providing secure communication, it is imperative that electromagnetic radiation and susceptibility be kept to a minimum. This requirement, in turn, is best satisfied by minimizing the number of electrical conductors which the communication link depends on to effect data communication. Thus, serial communication is an attractive approach.

Echoplex transmission is a special serial communication scheme which provides error free transmission. In providing secure communication, the data transmission must be error free, and it is also desirable to control the communication as much as possible through software rather than hardware. Further, it is desirable that such communication be fast, so that the individual computer processors which are communicating do not become input/output bound. Echoplex communication satisfies each of these requirements.

In implementing echoplex communication, two one-way ("simplex") circuits are used with the ability to present either a low logic level (0 volts) or a high logic level (5 volts) on each circuit. One simplex circuit is used for the transmission of data from a device, and the other is used for reception of information by the device.

In echoplex transmission, data is communicated between units on a message basis, serially over the first simplex circuit, and by echoing back (hence echoplex) the transmitted signal over the second simplex circuit on a bit-by-bit basis. A comparison is made at the transmitter to determine, in real time, if the signal sent by the transmitter is the same as the signal received by transmitter. If the signals are the same, the transmitter sends a no-error pulse to the receiver. Data transfer rate is slowed only by the time required for the no-error pulse.

Echoplex communication is serial, bit synchronous, word asynchronous, start/stop communication, for example at 9600 baud. The communication is solely on the basis of messages, i.e., separate control lines are not provided between the communicating units for control of the communications. Each byte is 10 bits, beginning with a start bit followed by an 8 bit word, or byte, and concluding with a stop bit. The last stop bit of a message has a sense opposite to that of all other stop bits of the message, in order to indicate the end of the message. A logical zero is indicative of a start bit, an end of message stop bit, and typically is a zero data bit. A logical one can represent a request to send, a clear to send, an end of byte stop bit, a one data bit, and also the presence of a no-error pulse, which typically is a high.

If the messages have more than one word, the second word of the message may contain a format byte, consisting of two nibbles, i.e., four-bit groups. The first nibble tells the number of nibbles of data in the message, and the second nibble gives the number of digits to the right of the decimal point of the data, or corresponds to a hexadecimal F if there is no explicit decimal point.

When a message is ready to be sent by a unit, the receive line of the unit is first tested. If it is low then the transmitting device raises its send line to a high, and again tests the receive line. If it is still low, the unit is free to transmit, otherwise, it must become a receiver. This avoids contention between two units.

Figure 3:
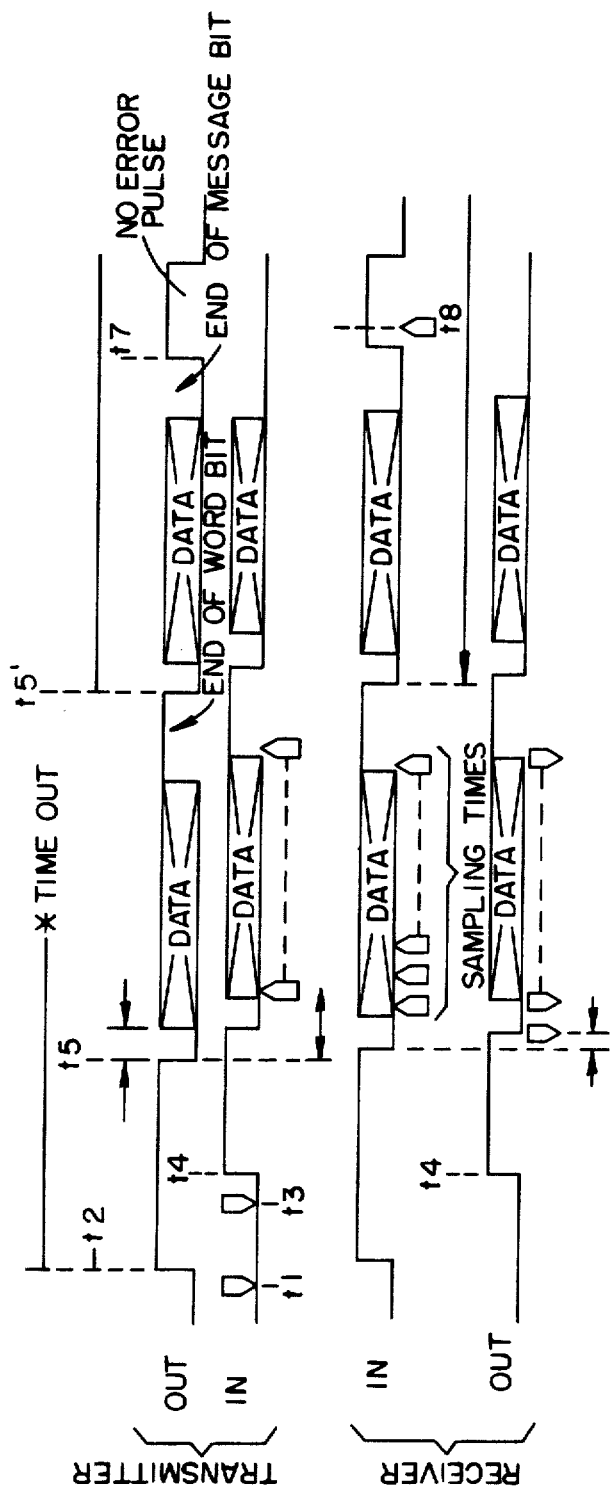
FIG. 3 is a timing diagram illustrating the echoplex communication scheme utilized in accordance with the present invention.

The timing of the messges constitutes the crux of the communication system whereby the messages may be asynchronous. Typical timing is illustrated in FIG. 3, which illustrates the relative timing of the lines of the transmitter for sending a given message, and the lines of a receiver for receiving the same message. Since the transmitter output line is the same as the receiver input line, it will be evident that these two signal lines are identical. The same is true, of course, with respect to the transmitter input line and the receiver output line.

In a successful transmission system of this type, the transmitter tests its input line at time $t_1$ and, if a low is detected, raises its output line to a high within 50 microseconds, as shown at $t_2$. The transmitter then again tests its input line at time $t_3$ within 50–100 microseconds. If the input line is still at a low then the transmitter can start to send its message at time $t_5$ following a minimum wait of 120 microseconds, by the lowering of this output line to form the start bit of the message. In the meantime, at time $t_4$, the receiver has raised its output line to a high level in a minimum of 100 microseconds indicating it is ready to receive data. This indicates a "clear to send" condition. The timing between the succeeding bytes of a multibyte message, as indicated by the time interval between $t_5$ and $t_5'$, is 1134.375 microseconds minimum, in order to insure that the receiver has been enabled to effect proper reception and storage of the signals.

The time from the beginning $t_5'$ of the last message byte and the transmission of a no-error pulse at time $t_7$ is set at 1031.25 to 1157.291 microseconds, and the no-error pulse has a width from 309.375 microseconds to 368.228 microseconds. The receiver must test for the occurrence of a no-error pulse at time $t_8$ from 1187.291 to 1340.625 microseconds following the initiation of the start pulse of the last byte of the message. The transmitter bit transitions must be in accordance with Table 1, below, and the receiver sampling of the data and stop bits must be in accordance with the timing illustrated in Table II.

TABLE I

| n | BIT | MINIMUM | MAXIMUM |
|---|---|---|---|
| 1 | START | 0 | 0 |
| 2 | DATA 1 | 103.125 | 105.208 |
| 3 | DATA 2 | 206.25 | 210.417 |
| 4 | DATA 3 | 309.375 | 315.625 |
| 5 | DATA 4 | 412.500 | 420.833 |
| 6 | DATA 5 | 515.625 | 526.042 |
| 7 | DATA 6 | 618.750 | 631.250 |
| 8 | DATA 7 | 721.875 | 736.458 |
| 9 | DATA 8 | 825.000 | 841.667 |
| 10 | STOP | 928.125 | 946.875 |

TABLE II

| n | BIT | MINIMUM |
|---|---|---|
| 1 | START | — |
| 2 | D1 | 115.208 |
| 3 | D2 | 220.416 |
| 4 | D3 | 325.624 |
| 5 | D4 | 430.832 |
| 6 | D5 | 536.040 |
| 7 | D6 | 641.248 |
| 8 | D7 | 746.456 |
| 9 | D8 | 851.664 |
| 10 | STOP | 956.872 |

With the above timing, asynchronous transmission is thereby feasible so that control leads for this purpose between the units are unnecessary.

Further, in order to insure that the information is correctly received by the receiver without error, the data is sequentially returned to the transmitter on the receiver output line. The times for the retransmission of the data, from the beginning of the instruction loop detecting a start bit, are given in table III, and the times for sampling this data on the input line to the transmitter are given in table IV.

If, and only if the received data at the transmitter is the same as the sent data, will the no-error pulse be transmitted at the end of the message.

As a further control over the message communication, the transmitter will wait for a minimum 3.5 millisecond for a clear to send signal from the receiver after presenting a request to send transmission, and similarly, the receiver will wait for about 3.5 milliseconds maximum for the start of a message after presenting the clear to send message. Contention between units is further minimized by setting determined periods that must be existent between adjacent transmitter activity of a unit, as well as between adjacent receivers.

TABLE III

| n | BIT | MINIMUM | MAXIMUM* |
|---|---|---|---|
| 1 | START | 32.083 | 73.125 |
| 2 | D1 | 137.292 | 176.250 |
| 3 | D2 | 242.500 | 279.375 |
| 4 | D3 | 347.708 | 382.500 |
| 5 | D4 | 452.917 | 485.625 |
| 6 | D5 | 558.125 | 588.75 |
| 7 | D6 | 663.333 | 691.875 |
| 8 | D7 | 768.542 | 795.000 |
| 9 | D8 | 873.750 | 898.125 |
| 10 | STOP | 978.958 | 1001.250 |

*Allows 10 usec for program loop uncertainty in detection start pulse. If uncertainty is greater than 10 usec the excess should be subtracted from each maximum value.

TABLE IV

| n | BIT | MINIMUM | MAXIMUM |
|---|---|---|---|
| 1 | START | 103.125 | 135.208 |
| 2 | D1 | 206.250 | 240.416 |
| 3 | D2 | 309.375 | 345.625 |
| 4 | D3 | 412.500 | 450.833 |
| 5 | D4 | 515.625 | 556.041 |
| 6 | D5 | 618.750 | 661.250 |
| 7 | D6 | 721.875 | 766.458 |
| 8 | D7 | 825.000 | 871.667 |
| 9 | D8 | 928.125 | 976.875 |
| 10 | STOP | 1031.250 | 1082.083 |

All functions of an electronic postage meter, except purely local manual functions such as power on and date change, are controllable electrically from a remote location by a host computer coupled to the postage meter through the interface of the present invention. Within the electronic postage meter, a software routine will scan for the presence of an external control device, and permit subrogation of control to such external device upon recognition of its validity. A new value of postage, and where it is to be set, is one example of a function which can be acheived remotely by the host computer. The host computer can also monitor the current register values of the postage meter.

The external device coupled to the postage meter through the interface of the present invention does not have to be a host computer. It can, for example, include a plurality of operating devices, such as a scale, remote display, or other type of device which normally interfaces with electronic postage meters.

When the interface of the present invention is used to couple an external device to an electronic postage meter, information flows in two directions, either inbound towards the meter or outbound towards the external device. Control signals and requests, defined generally as controls, flow inbound towards the meter. Informational data flows outbound. The presence of an external device is determined by the postage meter by detecting a response to a clear to send signal. The present invention thereby renders a standard electronic postage meter capable of interfacing directly with external devices, which has heretofore been difficult to accomplish.

Figure 2:
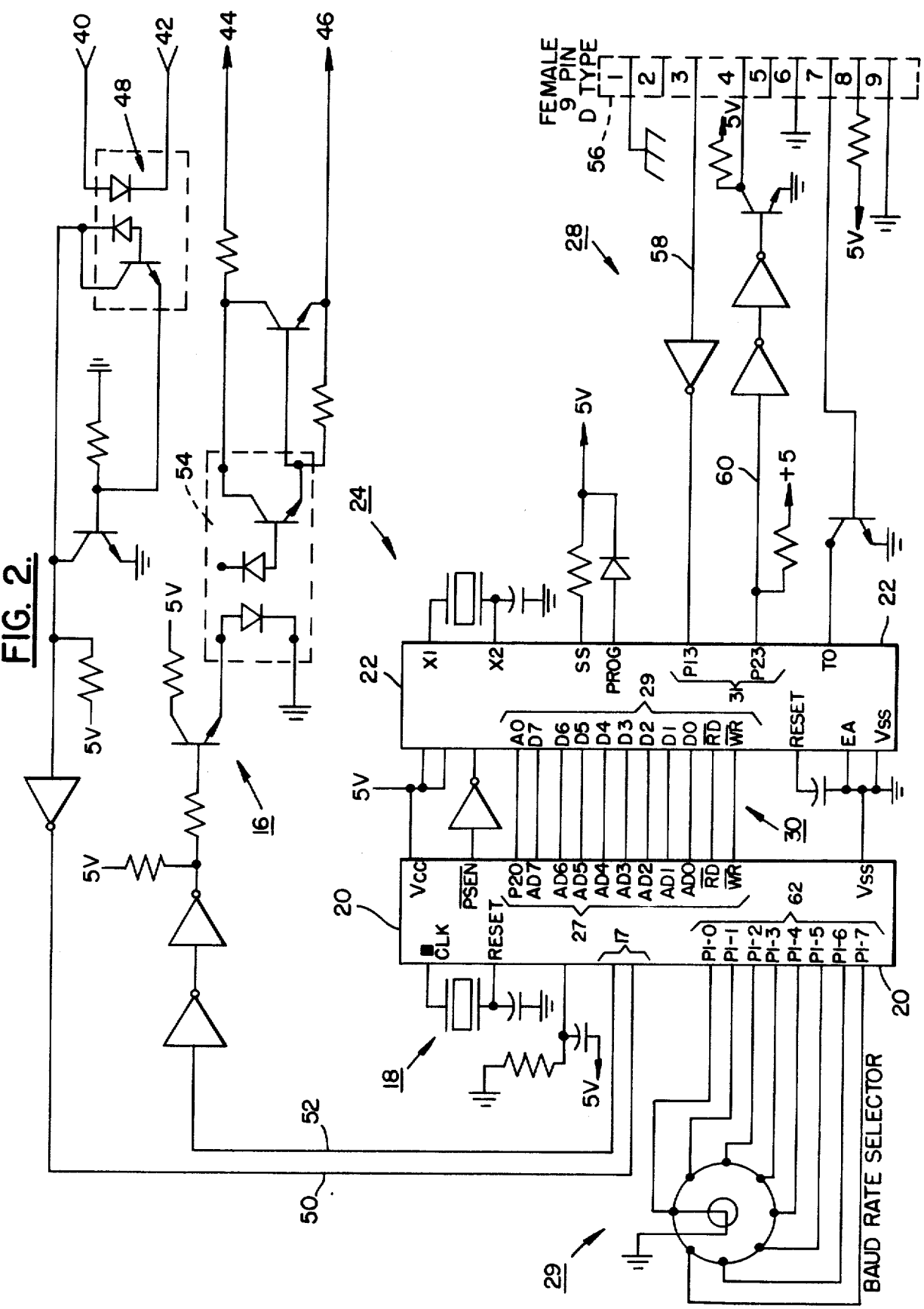
FIG. 2 is detailed schematic diagram of a preferred embodiment of the present invention.

Turning now to a preferred embodiment of the present invention, FIG. 2 shows a schematic diagram of the interface circuitry. An external device, such as a host computer, is coupled to the interface through terminals 40, 42, 44, and 46. Data to be received from an external device travels from terminals 40, 42 through an optocoupler 48 and associated driver circuitry 16 along path 50 to microprocessor 20. Data to be transmitted to the external device travels from microprocessor 20 along path 52, through driver circuitry 16 to an opto-coupler 54. Opto-coupler 54 is, in turn, coupled to the external device through terminals 44 and 46. Optocouplers 48 and 54 prevent damage to the interface and the devices coupled thereto from electric surges applied accidentally or intentionally, and also serve to eliminate electrical noise induced via groundloops.

Information flow to and from the device being controlled, e.g. a postage meter, travels from the interface to the device through a connector 56 which may be a standard nine pin connector. Echoplex data from the device being controlled travels through echoplex driver circuitry 28 on path 58. Information flow to the device under control flows through echoplex driver circuitry 28 on path 60.

A baud rate selector 26 can be provided, which is coupled through input port 62 to microprocessor 20. A different baud rate will result depending upon which of inputs P1.0 through P1.7 is grounded. Provision is made for the baud rate selection in the control program stored in the non-volatile memory of microprocessor 20.

Microprocessor 20 and peripheral interface processor 22 are initialized upon power up through their respective reset inputs. The operating frequency of microprocessor 20 is established by crystal controlled clock 18. Similarly, the operating frequency of peripheral interface processor 22 is established by crystal controlled clock 24.

The operation of microprocessor 20 and peripheral interface controllor 22 is controlled by software stored in the non-volatile memory thereof. When echoplex data from an external device is present at pin 3 of connector 56, such data is input via path 58 and echoplex data port 31 into peripheral interface processor 22. The inputted echoplex data is then converted to a parallel format and outputted from second parallel data port 29 of peripheral interface processor 22, across parallel communication path 30, to first parallel data port 27 of microprocessor 20. The data is then converted by microprocessor 20 to a standard serial format and transmitted from serial data port 17 across path 52, opto-coupler 54, and serial driver circuitry 16 to the device (e.g., host computer) connected to terminals 44 and 46.

When serial data is present at terminals 40 and 42 for transmission to the device under control (e.g. postage meter) coupled to connector 56, the serial data from terminals 40 and 42 is transmitted across optocoupler 48, driver circuitry 16, and path 50 to serial data port 17 of microprocessor 20. The serial data received through serial data port 17 is converted by microprocessor 20 into a parallel format, and transmitted from first parallel data port 27, across parallel communication path 30, to second parallel data port 29 of peripheral interface processor 22. Peripheral interface processor 22 then converts the parallel data to an echoplex format, and transmits it to the device under control from echoplex data port 31, across path 60, to pin 4 of connector 56.

As noted above, echoplex transmission overcomes contention problems by establishing a priority for receiving and transmitting data. If both ends of the interface, i.e. the serial device and the echoplex device, wish to transmit at the same time, priority is awarded to the echoplex device. Within microprocessor 20 and peripheral interface processor 22, communication is further prioritized by the software. Within peripheral interface processor 22, first means is provided for detecting the presence of an echoplex message to be received from the external device (e.g. postage meter) coupled thereto. In the event such a message is detected, the message is inputted to peripheral interface processor 22 as described above. Second means converts each echoplex message received from the external device into a parallel format, and transmits the parallel formatted message to microprocessor 20. Third means in the peripheral interface processor 22 detects the presence of a message to be received from microprocessor 20, and in the event such a message is detected, receives the message and outputs it in echoplex format to the external device coupled to peripheral interface processor 22. Through software control, the operation performed by the first, second and third means are prioritized by awarding first, second and third priority to the first, second and third means respectively.

In microprocessor 20 there are four levels of priority. First priority in microprocessor 20 is awarded to the detection of the presence of a message to be received from peripheral interface processor 22, and in the event such a message is detected, for inputting the message into microprocessor 20. Second priority is awarded to the detection of the presence of a message waiting in microprocessor 20 to be outputted to peripheral interface processor 22, and in the event such a message is detected, for outputting the message to peripheral interface processor 22. Third priority within microprocessor 20 is awarded to the detection of the presence of a message waiting in microprocessor 20 be transmitted to the external device (e.g. host computer) coupled to microprocessor 20, and in the event such a message is detected, for transmitting the message to the external device in a serial format. Fourth priority in microprocessor 20 is awarded to the detection of the presence of a message to be received from the external device (e.g. host computer) coupled to microprocessor 20, and in the event such a message is detected, for receiving the message in a serial format into microprocessor 20.

Through software control, error identification can be provided in the interface of the present invention. One error which may be identified is the rejection of a command from the external device coupled to microprocessor 20. Another error which may be identified is the loss of an echoplex message outputted from the echoplex data port of peripheral interface processor 22 to the external device (e.g. postage meter) coupled to peripheral interface processor 22. A third error which may be identified is the loss of an echoplex message to be received from the external device coupled to peripheral interface processor 22.

The interface of the present invention can be used for diagnostic purposes and for real time analysis of the operation of an external unit coupled to peripheral interface processor 22. By providing means, through software control, for determining the time elapsed during data transfers between the external device coupled to microprocessor 20 (e.g. host computer) and the external device coupled to peripheral interface processor 22 (e.g. postage meter), communication between the external devices coupled by the interface can be studied.

Appendix A attached hereto is a detailed printout of each of the programs contained in microprocessor 20 for the control of the various functions thereof. Appendix B attached hereto is a detailed printout of each of the programs stored in peripheral interface processor 22 for the control of each of the operations performed thereby. Neither Appendix A nor Appendix B have been printed although they are part of the file.

While this invention has been disclosed and described with reference to a single embodiment thereof, it will be apparent that variations and modifications may be made therein, and it is intended in the following claims to cover such variation and modification as falls within the true spirit and scope of the invention.

What is claimed is:

1. Transparent interface apparatus for providing real time data communication between a first device utilizing serial communication and a second device utilizing echoplex communication comprising:

a first microprocessor having a serial data port and a first parallel data port;

a second microprocessor having a second parallel data port and an echoplex data port;

a parallel communication path coupling said first and second parallel data ports;

means within said first microprocessor for converting serial data from said serial data port into a parallel format and for transferring this parallel formatted data to said second parallel data port from said first parallel data port across said parallel communication path;

means within said second microprocessor for converting parallel data from said second parallel data port into an echoplex format and for outputting said echoplex formatted data from said echoplex data port;

means within said second microprocessor for converting echoplex data from said echoplex data port into a parallel format and for transferring this parallel formatted data to said first parallel data port from said second parallel data port across said parallel communication path;

means within said first microprocessor for converting parallel data from said first parallel data port into a serial formal and for outputting this serial formatted data from said serial data port; and means for prioritizing data transfer between said first and second microprocessors, said prioritizing means awarding first priority to echoplex data to be transferred from said echoplex port for output from said serial data port and second priority to serial data to be transferred from said serial port for output from said echoplex data port.

2. The apparatus of claim 1 further comprising first clock means for operating said first microprocessor at one frequency, and second clock means for operating said second microprocessor at a different frequency, whereby said first and second microprocessors operate asynchronously.

3. The apparatus of claim 1 further comprising means for determining the time elapsed during data transfers between said serial data port and said echoplex data port.

4. The apparatus of claim 1 further comprising means for coupling said serial data port to a host computer and means for coupling said echoplex data port to a peripheral unit.

5. The apparatus of claim 1 further comprising first error identification means for signaling said host computer when a command from the host computer has been rejected, second error identification means for signalling said host computer when an echoplex message outputted from said echoplex data port to said peripheral unit has been lost, and third error identification means for signalling said host computer when an echoplex message to be received from said peripheral unit has been lost.

6. The apparatus of claim 5 wherein said peripheral unit is an electronic postage meter.

7. Apparatus for interfacing an electronic postage meter utilizing echoplex data communication to a serial communication host computer to provide real time data communication between said postage meter and host computer, said apparatus comprising:

a microprocessor having a serial data transmission terminal, a serial data receiving terminal, a first parallel data port, and non-volatile memory containing a control program;

a programmable peripheral interface processor having an echoplex data transmission terminal, an echoplex data receiving terminal, a second parallel data port, and non-volatile memory containing a control program;

a first stable clock coupled to said microprocessor for establishing the operating frequency of the microprocessor;

a second stable clock coupled to said programmable peripheral interface processor for establishing the operating frequency of the peripheral interface processor;

a parallel communication path coupling said first and second parallel data ports;

first means responsive to the control program in said peripheral interface processor for detecting the presence of an echoplex message to be received from said postage meter, and in the event such message is detected, for inputting the message into said peripheral interface processor;

second means responsive to the control program in said peripheral interface processor for converting each echoplex message received from said postage meter into a parallel format; and for transmitting the parallel formatted message across said parallel communication path to said microprocessor;

third means responsive to the control program in said peripheral interface processor for detecting the presence of a message to received from said microprocessor, and in the event such message is detected, for receiving same across said parallel communication path and outputting the same in an echoplex format to said postage meter;

means for prioritizing the operations performed by said first, second and third means by awarding first, second and third priority to said first, second and third means respectively;

fourth means responsive to the control program in said microprocessor for detecting the presence of a message to be received from said peripheral interface processor, and in the event such message is detected, for inputting the message into said microprocessor;

fifth means responsive to the control program in said microprocessor for detecting the presence of a message waiting in said microprocessor to be outputted to said peripheral interface processor, and in the event such message is detected, for outputting the message across said parallel communication path to said peripheral interface processor;

sixth means responsive to the control program in said microprocessor for detecting the presence of a message waiting in said microprocessor to be transmitted to said host computer, and in the event such message is detected, for transmitting the message to said host computer in a serial format;

seventh means responsive to the control program in said microprocessor for detecting the presence of a message to be received from said host computer, and in the event such a message is detected, for receiving the message in a serial format into the microprocessor; and means for prioritizing the operations performed by said fourth, fifth, sixth and seventh means by awarding first, second, third, and fourth priority to said fourth, fifth, sixth and seventh means respectively.

8. The apparatus of claim 7 further comprising first error identification means for signaling said host computer when a command from the host computer has been rejected, second error identification means for signalling said host computer when an echoplex message outputted from said echoplex data port to said postage meter has been lost, and third error identification means for signalling said host computer when an echoplex message to be received from said postage meter has been lost.

9. The apparatus of claim 7 further comprising means for determining the time elapsed during data transfers between said host computer and said postage meter.

10. The apparatus of claim 7 wherein said first and second clocks run at different frequencies, whereby said microprocessor and said peripheral interface processor operate asynchronously.

* * * * *